(12) United States Patent
Dudgeon et al.

(10) Patent No.: US 10,146,640 B2
(45) Date of Patent: *Dec. 4, 2018

(54) RECOVERING A VOLUME TABLE AND DATA SETS

(71) Applicant: International Business Machines Corporation, Armonk, NY (US)

(72) Inventors: Kyle B. Dudgeon, Vail, AZ (US); Franklin E. McCune, Tucson, AZ (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/224,466

(22) Filed: Jul. 29, 2016

(65) Prior Publication Data

US 2016/0335164 A1 Nov. 17, 2016

Related U.S. Application Data

(63) Continuation of application No. 14/484,250, filed on Sep. 11, 2014, now Pat. No. 9,442,805, which is a (Continued)

(51) Int. Cl.
*G06F 11/00* (2006.01)
*G06F 11/14* (2006.01)

(52) U.S. Cl.
CPC ...... *G06F 11/1469* (2013.01); *G06F 11/1435* (2013.01); *G06F 11/1448* (2013.01); *G06F 11/1451* (2013.01); *G06F 2201/805* (2013.01)

(58) Field of Classification Search
CPC ............ G06F 11/1435; G06F 11/1446; G06F 11/1471; G06F 11/2069; G06F 11/1448; G06F 11/1451
See application file for complete search history.

(56) References Cited

U.S. PATENT DOCUMENTS

| 5,644,696 A | 7/1997 | Pearson et al. |
| 5,873,101 A * | 2/1999 | Klein ................. G06F 11/1451 707/640 |

(Continued)

FOREIGN PATENT DOCUMENTS

| TW | 200823652 A | 6/2008 |
| WO | WO2011008323 A2 | 1/2011 |

OTHER PUBLICATIONS

D. Lovelace, et al., "VSAM Demystified", IBM Corp., Document No. SG24-6105-01, Sep. 2003, pp. 1-524.

(Continued)

*Primary Examiner* — Marc Duncan
(74) *Attorney, Agent, or Firm* — David W. Victor; Konrad Raynes Davda & Victor LLP (57) ABSTRACT

Provided are a computer program product, system, and method for recovering a volume table and data sets from a volume. Content from a backup volume table comprising a valid backup of a volume table from backup of the volume is processed to generate a recovery volume table for a recovery volume. The data sets in the volume are processed to determine whether they are valid. The valid data sets are moved to the recovery volume. A data recovery operation is initiated for the data sets determined not to be valid.

21 Claims, 7 Drawing Sheets

Related U.S. Application Data continuation of application No. 14/072,717, filed on Nov. 5, 2013, now Pat. No. 9,009,527, which is a continuation of application No. 13/535,253, filed on Jun. 27, 2012, now Pat. No. 8,892,941.

(56) References Cited

U.S. PATENT DOCUMENTS

| | | | |
|---|---|---|---|
| 6,173,291 | B1 | 1/2001 | Jenevein |
| 6,397,351 | B1* | 5/2002 | Miller ............... G06F 11/1469 714/13 |
| 6,970,890 | B1 | 11/2005 | Bruce et al. |
| 7,177,993 | B1 | 2/2007 | Kiselev et al. |
| 7,415,586 | B2 | 8/2008 | Mimatsu et al. |
| 7,613,946 | B2 | 11/2009 | Ashton et al. |
| 7,756,833 | B2 | 7/2010 | Van Ingen et al. |
| 7,822,758 | B1 | 10/2010 | Prakash et al. |
| 7,831,769 | B1 | 11/2010 | Wen et al. |
| 7,882,386 | B1 | 2/2011 | Potnis et al. |
| 8,892,941 | B2 | 11/2014 | Dudgeon et al. |
| 9,009,527 | B2 | 4/2015 | Dudgeon et al. |
| 9,037,901 | B2 | 5/2015 | Chauvet et al. |
| 9,063,892 | B1* | 6/2015 | Taylor ............... G06F 11/1446 |
| 2004/0030951 | A1* | 2/2004 | Armangau .......... G06F 11/1469 714/6.11 |
| 2004/0153736 | A1 | 8/2004 | Viswanathan et al. |
| 2007/0130214 | A1 | 6/2007 | Boyd et al. |
| 2008/0263299 | A1 | 10/2008 | Suzuki |
| 2009/0228672 | A1 | 9/2009 | Uratani et al. |
| 2010/0094811 | A1 | 4/2010 | Lehr et al. |
| 2010/0185589 | A1 | 7/2010 | Clarke et al. |
| 2012/0110289 | A1 | 5/2012 | Murase et al. |
| 2012/0191932 | A1 | 7/2012 | Satoyama et al. |
| 2013/0054924 | A1 | 2/2013 | Dudgeon et al. |
| 2013/0297971 | A1 | 11/2013 | Akirav et al. |
| 2014/0006853 | A1 | 1/2014 | Dudgeon et al. |
| 2014/0059376 | A1 | 2/2014 | Dudgeon et al. |
| 2014/0380097 | A1 | 12/2014 | Dudgeon et al. |
| 2015/0278034 | A1* | 10/2015 | Barnes ............. G06F 17/30079 714/15 |

OTHER PUBLICATIONS

R. Sears, et al., "To BLOB or Not to BLOB: Large Object Stgorage in a Database or a Filesystem?", Microsoft Corp., Technical Report MSR-TR-2006-45, Apr. 2006, pp. 1-11.

"DFSMS Managing Catalogs", IBM Corp., Document No. SC26-7409-09, Sep. 2010, pp. 1-266.

U.S. Appl. No. 13/217,137, filed Aug. 24, 2011 (18.417).

U.S. Appl. No. 13/535,253, filed Jun. 27, 2012 (18.453).

Office Action dated Mar. 7, 2014, pp. 11, for U.S. Appl. No. 13/535,253, filed Jun. 27, 2012 (18.453).

Response dated Jun. 9, 2014, pp. 11, to Office Action dated Mar. 7, 2014, pp. 11, for U.S. Appl. No. 13/535,253, filed Jun. 27, 2012 (18.453).

Notice of Allowance dated Jul. 8, 2014, pp. 9, for U.S. Appl. No. 13/535,253, filed Jun. 27, 2012 (18.453).

U.S. Appl. No. 14/072,717, filed Nov. 5, 2013 (18.453C1).

Preliminary Amendment filed Nov. 5, 2013, pp. 2, for U.S. Appl. No. 14/072,717, filed Nov. 5, 2013 (18.453C1).

Office Action dated Aug. 1, 2014, pp. 15, for U.S. Appl. No. 14/072,717, filed Nov. 5, 2013 (18.453C1).

Response dated Nov. 5, 2014, pp. 7, to Office Action dated Aug. 1, 2014, pp. 15, for U.S. Appl. No. 14/072,717, filed Nov. 5, 2013 (18.453C1).

Notice of Allowance dated Nov. 25, 2014, pp. 11, for U.S. Appl. No. 14/072,717, filed Nov. 5, 2013 (18.453C1).

U.S. Appl. No. 14/484,250, filed Sep. 11, 2014 (18.453C2).

Preliminary Amendment dated Nov. 5, 2014, pp. 9, for U.S. Appl. No. 14/484,250, filed Sep. 11, 2014 (18.453C2).

Office Action received Jan. 29, 2016, pp. 18, for U.S. Appl. No. 14/484,250, filed Nov. 9, 2014 (18.453C2).

Response dated Apr. 29, 2016, pp. 9, to Office Action received Jan. 29, 2016, pp. 18, for U.S. Appl. No. 14/484,250, filed Sep. 11, 2014 (18.453C2).

Notice of Allowance dated Jun. 2, 2016, pp. 5, for U.S. Appl. No. 14/484,250, filed Sep. 11, 2014 (18.453C2).

* cited by examiner

RECOVERING A VOLUME TABLE AND DATA SETS

CROSS-REFERENCE TO RELATED APPLICATION

This application is a continuation of U.S. patent application Ser. No. 14/484,250, filed Sep. 11, 2014, which is a continuation of U.S. patent application Ser. No. 14/072,717, filed Nov. 5, 2013 and issued as U.S. Pat. No. 9,009,527 published on Apr. 14, 2015, which is a continuation of U.S. patent application Ser. No. 13/535,253, filed Jun. 27, 2012 and issued as U.S. Pat. No. 8,892,941 published on Nov. 18, 2014, which patent and patent applications are incorporated herein by reference in their entirety.

BACKGROUND OF THE INVENTION

1. Field of the Invention

The present invention relates to a computer program product, system, and method for recovering a volume table and data sets.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage. For Virtual Storage Access Method (VSAM) data sets, the z/OS operating system provides VSAM volume data sets (VVDS) stored in a data set to provide information on VSM key sequenced data sets. (Z/OS is a registered trademark of IBM in the United States and other countries)

Data sets in volumes may occasionally be overlaid or damaged such that certain of the data sets are not usable even though other parts of the volume are valid. To address a volume corruption error, the client systems may attempt to recover the entire volume and perform forward recovery on every data set on the volume as if the data is not usable. If a forward recovery solution is not available, then updates since a last backup may be lost. Administrators may also perform manual checks of the volume using recovery tools to recover the data.

There is a need in the art for improved techniques to recover a corrupted volume.

SUMMARY

Provided are a computer program product, system, and method for recovering a volume table and data sets from a corrupted volume. Data corruption is detected in a volume having data sets in a storage device. A volume table having information on the data sets allocated in the volume is diagnosed to determine whether the volume table is valid, wherein the volume table is used to determine the data sets in the volume. A backup volume table comprising a most recent valid backup of the volume table is accessed from a backup of the volume in response to determining that the diagnosed volume table is not valid. Content from the backup volume table is processed to bring to a current state in a recovery volume table for a recovery volume. The data sets in the volume are processed to determine whether they are valid. The valid data sets are moved to the recovery volume. A data recovery operation is initiated for the data sets determined not to be valid.

DETAILED DESCRIPTION

Described embodiments provide techniques for recovering a volume table and data sets from a corrupted volume to a recovery volume. Described embodiments are utilized when certain of the data in the volume is valid while other data is corrupted. Described embodiments use previous backups of the volume table and data sets to compare with the volume table and data sets in the current volume, along with data set records on changes made since a time of the backup volume, to determine valid portions of the volume to recover in a recovery volume.

Figure 1:
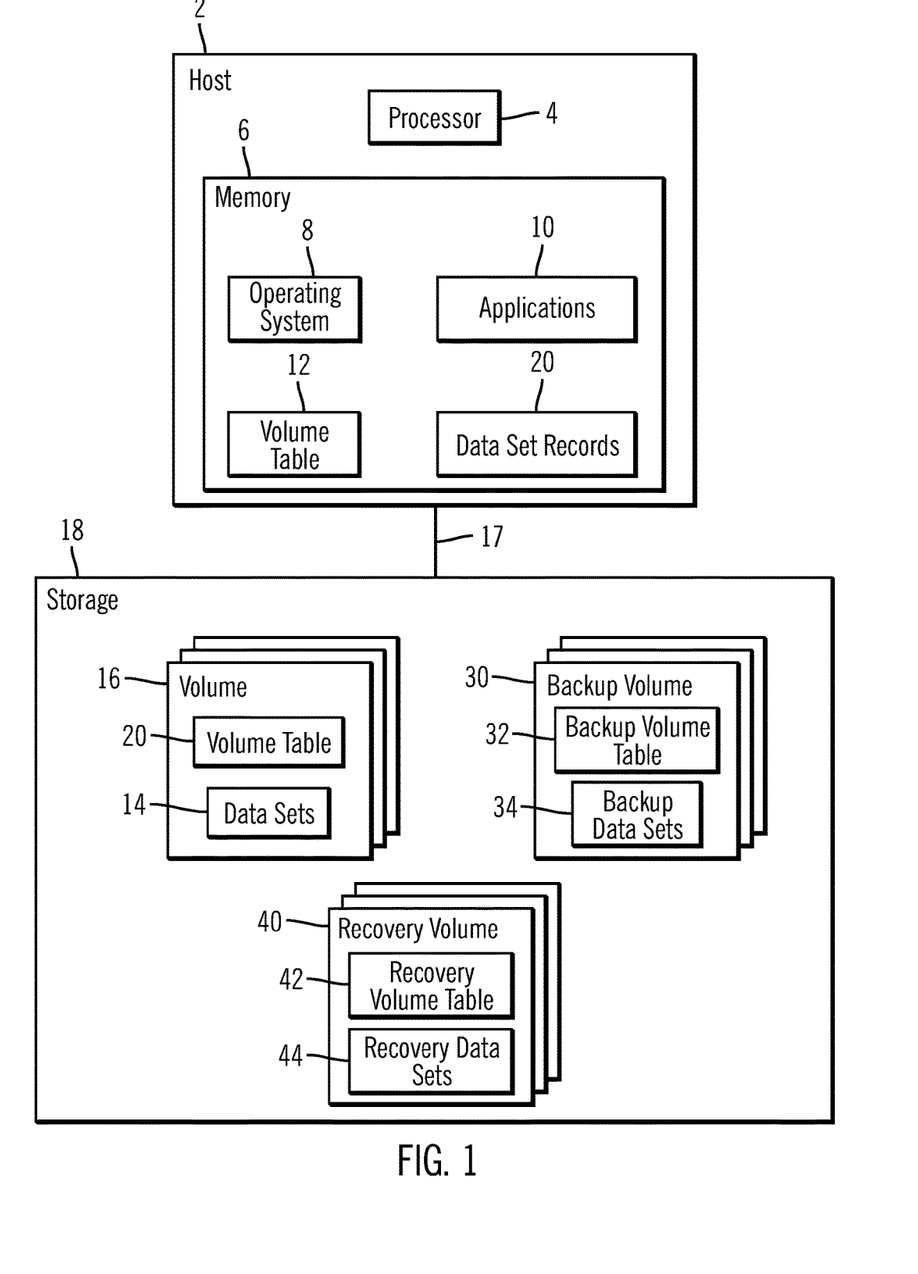
FIG. 1 illustrates an embodiment a computing environment.

FIG. 1 illustrates an embodiment of a computing environment. A host 2 includes a processor 4, which may comprise one or more processors, and a memory 6 including programs, such as an operating system 8 and applications 10, and a volume table 12 providing information on data sets 14 stored in volumes 16 configured in storage space in a storage 18. The one or more applications 10 submit data requests to the operating system 8 that are sent to the storage 18. The host 2 may also receive data requests directed to the storage 18 from other systems that communicate with the host 2 via a network. In one embodiment, the memory 6 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), etc.

A data set 14 comprises a collection of data intended to be stored in a same logical allocation of data, such as data from a single application, user, enterprise, etc. A data set may 14 be comprised of separate files or records, or comprise a single file or record. The data sets 14 may comprise indexed data sets that are indexed according to a primary key that is used to locate records in the data set 14. Data set indexes provide an index for each indexed data set 14. For instance, in IBM z/OS DFSMS implementations, the data set may comprise a Key Sequenced Data Set (KSDS) used in the IBM Virtual Storage Access Method (VSAM) storage, where each record in the KSDS data set has a unique key used to locate the record in the data set 14.

The host may further maintain data set records 20 providing information on the data sets 14 in the volume 16 independent of the volume table 20. In z/OS DFSMS implementations, the data set records 20 may comprise System Management Facilities (SMF) records that record changes to the volume table 20, such as changes to the data sets, including updates to the extents in a data set, new allocations of data sets to volumes, and deletions to data sets in the volumes 16. Such changes may be found in the "SMF 60" records for VSAM data sets and in the "SMF 14" and "SMF 15" records for non-VSAM data sets. In further z/OS embodiments, the data set records 20 may include the VVDS that provides information on VSAM data sets on the volume 16. The VVDS resides in data sets 14 in the volume 16 that store the catalog or a Storage Management Subsystem (SMS) data set that is cataloged.

The host 2 may comprise a computational device known in the art, such as a workstation, mainframe, server, etc. The host 2 may communicate Input/Output (I/O) requests to a control unit for the storage 18, such as a storage subsystem or server, such as an enterprise storage server, storage controller, etc., or other device used to manage I/O requests to attached volumes. The storage 18 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The host 2 communicates with the storage 18 via a connection 17. The connection 17 may comprise a network such as a Local Area Network (LAN), Storage Area Network (SAN), Wide Area Network (WAN), peer-to-peer network, wireless network, etc. Alternatively, the connection 17 may comprise a bus interface, such as a Peripheral Component Interconnect (PCI) bus or serial interface. The operating system 8 may comprise suitable operating systems known in the art, such as the International Business Machines ("IBM®") z/OS® operating system. (IBM and z/OS are trademarks of IBM in the United States and foreign countries).

The operating system 8 receives data requests from the applications 10. The applications 6 may include middleware, access methods, and independent software vendor (ISV) products. Data sets may hold critical data. The host 2 may also receive I/O requests from applications on systems over a network.

Each volume 16 includes a volume table 20 having information on the volume, including a mapping of tracks and extents of tracks to data sets 14. The volume table 20 may be stored in the volume 16, such as in the first few records of the volume. In z/OS implementations, the volume table 20 may comprise a volume table of contents (VTOC), which includes information on a location of data sets in the volume 16, such as a mapping of extents in the data set to storage locations in the volume. In alternative embodiments, the volume table 20 may comprise other types of file allocation data structures that provide a mapping of data to storage locations, either logical and/or physical storage locations. In this way, the volume table 20 provides a mapping of the data to data sets in the volume 16. The volume table 20 may be stored in records in the data sets 14 in the volume 16. Each data set 14 is comprised of one or more extents of data configured in the volume 16. The volume table 20 or other catalog data structure may further identify one or more free space records identifying ranges of available tracks in the volume 20.

The volume table 20 may include volume table records having for each volume 16 a volume name and data set records indicating data sets having extents configured in the volume 16. Each data set record may have information for each data set 14 in a volume 16, including the one or more extents assigned to the data set. The extent provides a mapping to tracks in the volume 16. A catalog may further include additional information on the data sets allocated to the volumes 16, such as allocation sizes.

The storage 18 may further have backup volumes 30 comprising back-ups of the volumes 16 at different points-in-time. Each backup volume 30, comprising a backup of a backed-up volume 16 as of a backup point-in-time, may have a backup volume table 34 comprising the volume table 20 in the backed-up volume 16 at the backup point-in-time and backup data sets 34 comprising the data sets 14 in the backed-up volume 16 at the backup point-in-time. The storage 18 may further have recovery volumes 40 comprising volumes recovered from valid data in a volume 16 experiencing data corruption and/or a most recent backup volume 30 for the corrupted volume 16. The recovery volume 40 includes a recovery volume table 42 providing volume table information for the recovered data sets 44.

The volume table 12 loaded in the memory 16 may comprise an instance of the volume tables 20, 32, and 42 that the operating system 8 loads into the memory 6 to use and process during recovery and other operations.

Figure 2:
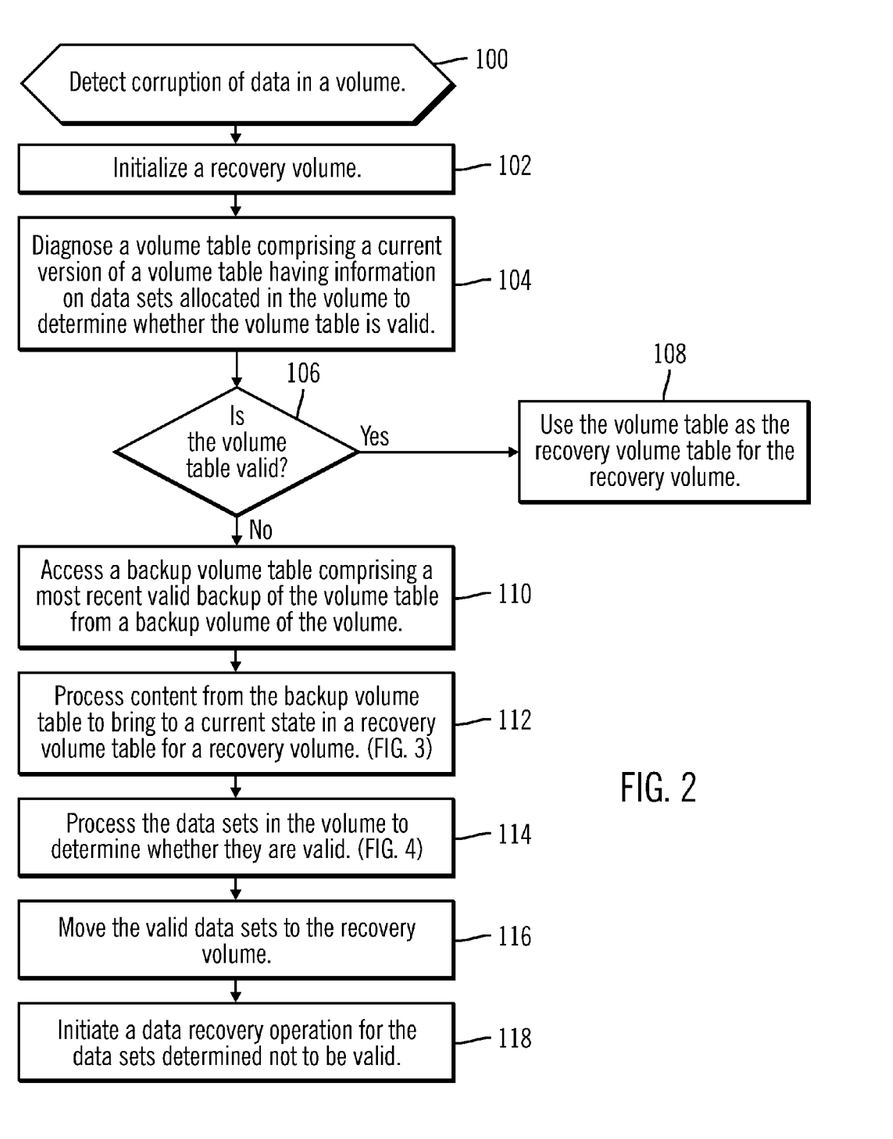
FIG. 2 illustrates an embodiment of operations to recover a corrupted volume.

FIG. 2 illustrates an embodiment of operations performed by the operating system 8 (or other program module in the host 2) to handle a detected corrupt volume 16. Upon detecting (at block 100) a possible corruption error, the operating system 8 initializes (at block 102) a recovery volume 40 in which to recover valid data from the corrupted volume 16. The operating system 8 diagnoses (at block 104) a volume table 20 having information on data sets 14 allocated in the corrupted volume 16 to determine whether the volume table 20 is valid. In z/OS implementations, for VVDS data sets, the IDCAM DIAGNOSE function may be used to diagnose the VVDS and for a VTOC, the Data Set Status (DSS) diagnosis tool may be used to analyze a VTOC. The volume 16 may be placed in a state where no additional allocations can occur.

If (at block 106) the volume table 20 is valid, then the volume table 20 is used as the recovery volume table 42 for the recovery volume 40. If (at block 106) the volume table 20 is not valid, then the operating system 8 determines (at block 110) a backup volume table 32 comprising a most recent valid backup of the volume table 20 from a backup volume 30 of the volume 16 For z/OS implementations where the volume table 20 comprises a VTOC, VTOC copies may be stored in Hierarchical Storage Management's (HSM) ML1 volumes during automatic backups or dump processing. The operating system 8 processes (at block 112) content from the backup volume table 32 to bring to a current state in a recovery volume table 42 for the recovery volume 40. In certain embodiments, the data set records 20 are used to determine changes to the volume table 20 to apply to the backup volume table 30 to bring to the current state. Further, in certain embodiments, the backup volume table 32 itself is not modified, but only the content from the backup volume table 32 being copied into the recovery volume table 42. The data sets 14 in the corrupted volume 16 to recover are processed (at block 114) to determine their validity. The operating system 8 moves (at block 116) the valid data sets 14 to the recovery data sets 44 in the recovery volume 40 being built. The operating system 8 may further initiate (at block 118) a data recovery operation for the data sets 14 determined not to be valid to determine whether to recover portions of those data sets.

Figure 3:
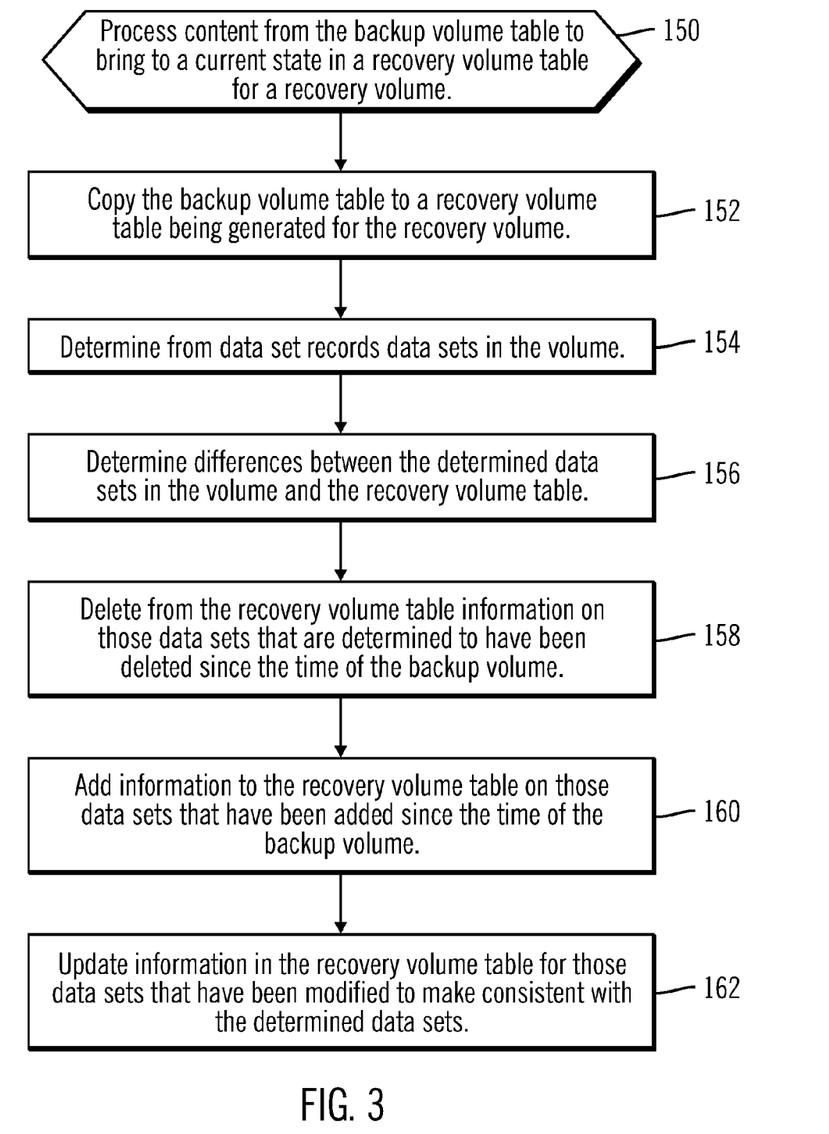
FIG. 3 illustrates an embodiment of operations to generate a recovery volume table by bringing content from a backup volume table to a current state.

FIG. 3 illustrates an embodiment of operations performed by the operating system 8 (or other program module in the host 2) to generate a recovery volume table 42 by bringing the content from the backup volume table 30 to a current state. In certain embodiments, the operations of FIG. 3 may comprise the operations performed at block 112 in FIG. 2. Upon initiating the operation to generate the recovery volume table 42 from the backup volume table 32, the operating system 8 copies (at block 152) the backup volume table 32 to the recovery volume table 32 to generate. The operating system 8 determines (at block 154) from the data set records 20 the data sets currently residing in the volume 16. As discussed, in z/OS implementations, this information on the data sets may be determined from the VVDS for VSAM data or determined from SMF records for VSAM and non-VSAM data sets. Additional information may also be considered to double check the information from the SMF records and VVDS, such as basic catalog structure (BCS) records having information on data sets that exist on the volume 16. The operating system 8 determines (at block 156) differences between the determined data sets in the volume and the recovery volume table 42 (which at this point comprises the backup volume table 32), such as data sets deleted, added and changes to data sets. Information is deleted (at block 158) from the recovery volume table 42 on those data sets that are determined to have been deleted since the time of the backup volume 30. Information is added (at block 160) to the recovery volume table 42 on those data sets that have been added since the time of the backup volume. Further, information in the recovery volume table 42 is updated (at block 162) for those data sets that have been modified to make consistent with the determined data sets, such as by adding or removing extents from the data set or updating information in extents in the data set.

Figure 4:
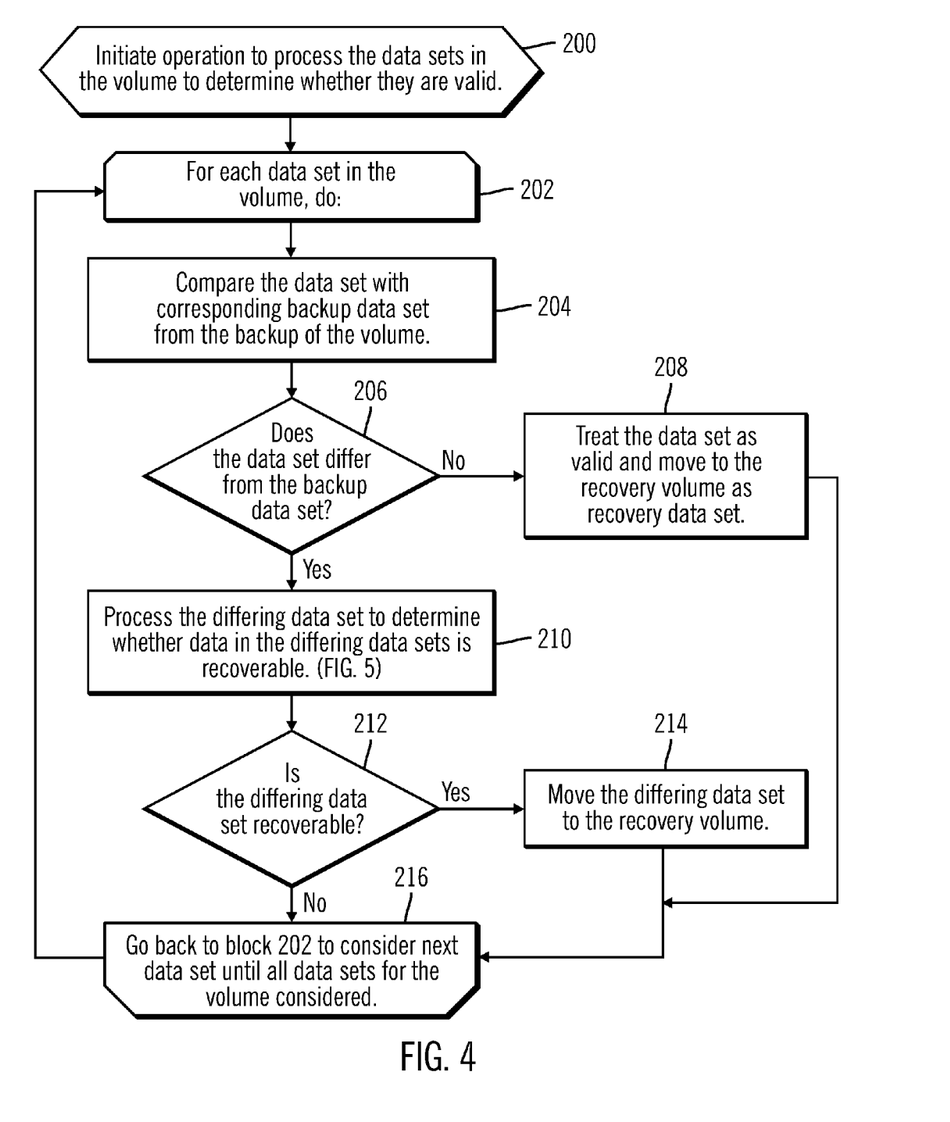
FIG. 4 illustrates an embodiment of operations to process data sets in a corrupted volume to determine whether they are valid as part of recovering the corrupted volume.

FIG. 4 illustrates an embodiment of operations performed by the operating system 8 (or other program module in the host 2) to process the data sets 14 in the volume 16 to determine whether they are valid. In certain embodiments, the operations of FIG. 4 may comprise the operations performed at block 114 in FIG. 2. Upon initiating (at block 200) the operation to determine the validity of the data sets 20 in the supposedly corrupted volume 16, the operating system 8 performs the operations at blocks 202 through 216 for each data set 14 in the volume 16. At block 204, the current version of the data set 14 is compared to the corresponding backup data set 34, comprising the backup of the data set 14 in the backup of the volume 30. If (at block 206) the data set 14 does not differ from the backup data set 34, then the data set 14 is considered valid and moved (at block 208) to the recovery volume 40 as a recovery data set 44. If (at block 206) the current 14 and backup 34 data sets differ, then the differing data set 14 is processed (at block 210) to determine whether data in the differing data sets is recoverable. If (at block 212) the differing data set is recoverable, then the differing data set 14 is moved (at block 214) to the recovery volume 40 as a recovery data set 44. After moving a valid data set 14 (at block 208 or 214) or if the data set 14 is not recoverable (from the no branch of block 212), control proceeds (at block 216) back to block 202 to consider any further data sets 14 in the volume 16.

Figure 5:
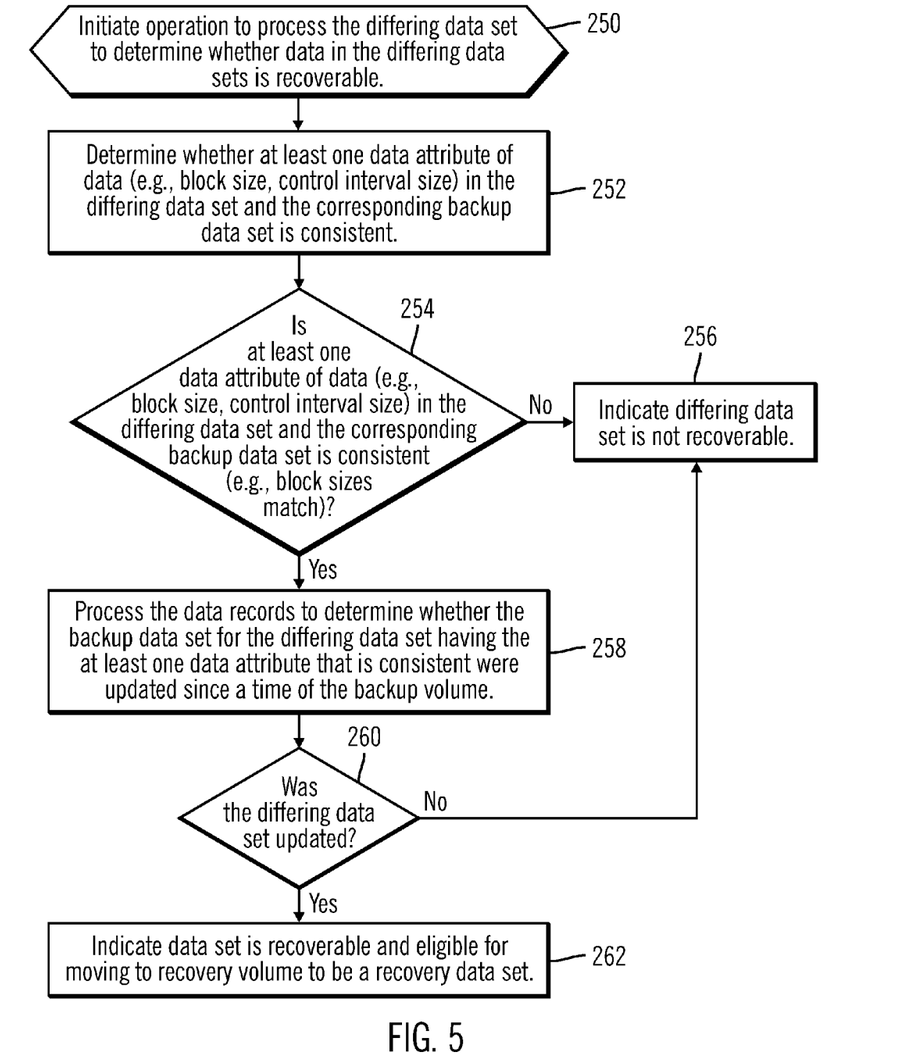
FIG. 5 illustrates an embodiment of operations to determine whether data sets different from corresponding backup data sets are recoverable as part of recovering the corrupted volume.

FIG. 5 illustrates an embodiment of operations performed by the operating system 8 (or other program module in the host 2) to process a data set 14 in the corrupted volume 16 that differs from the corresponding backup data set 34 to determine whether the differing data set is recoverable. In certain embodiments, the operations of FIG. 5 may comprise the operations performed at block 210 in FIG. 4. Upon initiating the operation (at block 250) to determine whether the differing data set 14 is recoverable, the operating system 8 determines (at block 252) whether at least one data attribute of data (e.g., block size, control interval size) in the differing data set 14 and the corresponding backup data set 34 is consistent. For instance, in certain embodiments, the attribute may comprise a block size, such that the differing data set 14 is consistent with the corresponding backup data set 34 if they both have the same block size. In further embodiments, the control interval size may determine whether they are consistent. The control interval size comprises the size of a unit of data that is transferred when an Input/Output (I/0) request is made, such that the transferred records are grouped into control intervals.

If (at block 254) at least one data attribute of data (e.g., block size, control interval size, etc.) in the differing data sets and the corresponding backup data sets are not consistent (e.g., block sizes match, control interval sizes are the same), then the differing data set is indicated (at block 256) as not recoverable. If the considered at least one data attribute indicates that the differing data set 14 is consistent with the corresponding backup data set 34, then the operating system 8 processes (at block 258) the data set records 20 to determine whether the backup data set 34 for the differing data set 14, having the at least one data attribute that is consistent, was updated since a time of the backup volume. If (at block 260) the differing data set 14 was not updated, then control proceeds to block 256 to indicate the differing data set 14 being considered as unrecoverable. Otherwise, if the differing data set 14 was updated, then the differing data set is indicated as recoverable and eligible for moving to the recovery volume 40 to be a recovery data set 44.

Figure 6:
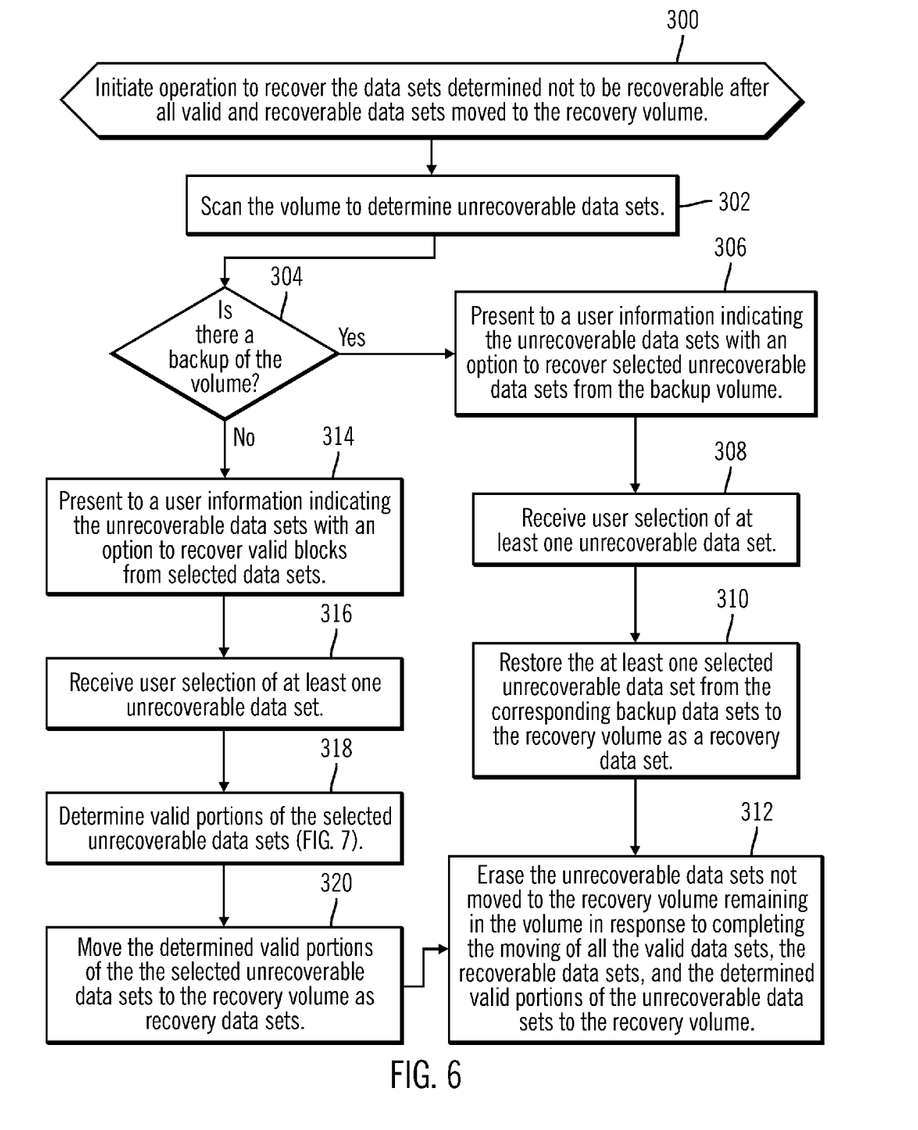
FIG. 6 illustrates an embodiment of operations to recover data sets determined not be recoverable as part of recovering the corrupted volume.

FIG. 6 illustrates an embodiment of operations performed by the operating system 8 (or other program module in the host 2) to recover data sets determined not to be recoverable. In certain embodiments, the operations of FIG. 6 may comprise the operations performed at block 118 in FIG. 2. Upon initiating (at block 300) the operation to recover the data sets 14 determined not to be recoverable, which may be performed after all valid and recoverable data sets are moved to the recovery volume 40 as recovery data sets 44, the operating system 8 scans (at block 302) the corrupted volume 16 to determine the unrecoverable data sets 14. If (at block 304) there is a backup 30 of the volume 16, then the operating system 8 presents (at block 306) to a user information indicating the unrecoverable data sets with an option to recover selected unrecoverable data sets from the backup volume. The information may be presented via a computer user interface, electronic message, email, etc. Upon receiving (at block 308) user selection, such as via a computer user interface or electronic message, of at least one unrecoverable data set to recover from the backup volume 30, the operating system 8 restores (at block 310) the at least one selected unrecoverable data set from the corresponding backup data set 34 to the recovery volume as a recovery data set 44.

If (at block 304) there is no backup of the corrupted volume 16, then the operating system 8 presents (at block 314) to a user information indicating the unrecoverable data sets 14 with an option to recover valid blocks from selected data sets. Upon receiving (at block 316) user selection of at least one of the unrecoverable data sets 14, the operating system 8 determines (at block 318) valid portions of the selected unrecoverable data sets 14, such as valid tracks or blocks. The determined valid portions are moved (at block 320) to the recovery volume 40 as recovery data sets 44. After restoring (at block 310) or moving valid portions of data sets (at block 320) to the recovery volume 40 as recovery data sets 44, the operating system 8 erases (at block 312) the unrecoverable data sets 14 not moved to the recovery volume 40 remaining in the volume in response to completing the moving of all the valid data sets 14, the recoverable data sets 14, and the determined valid portions of the unrecoverable data sets to the recovery volume 40.

Figure 7:
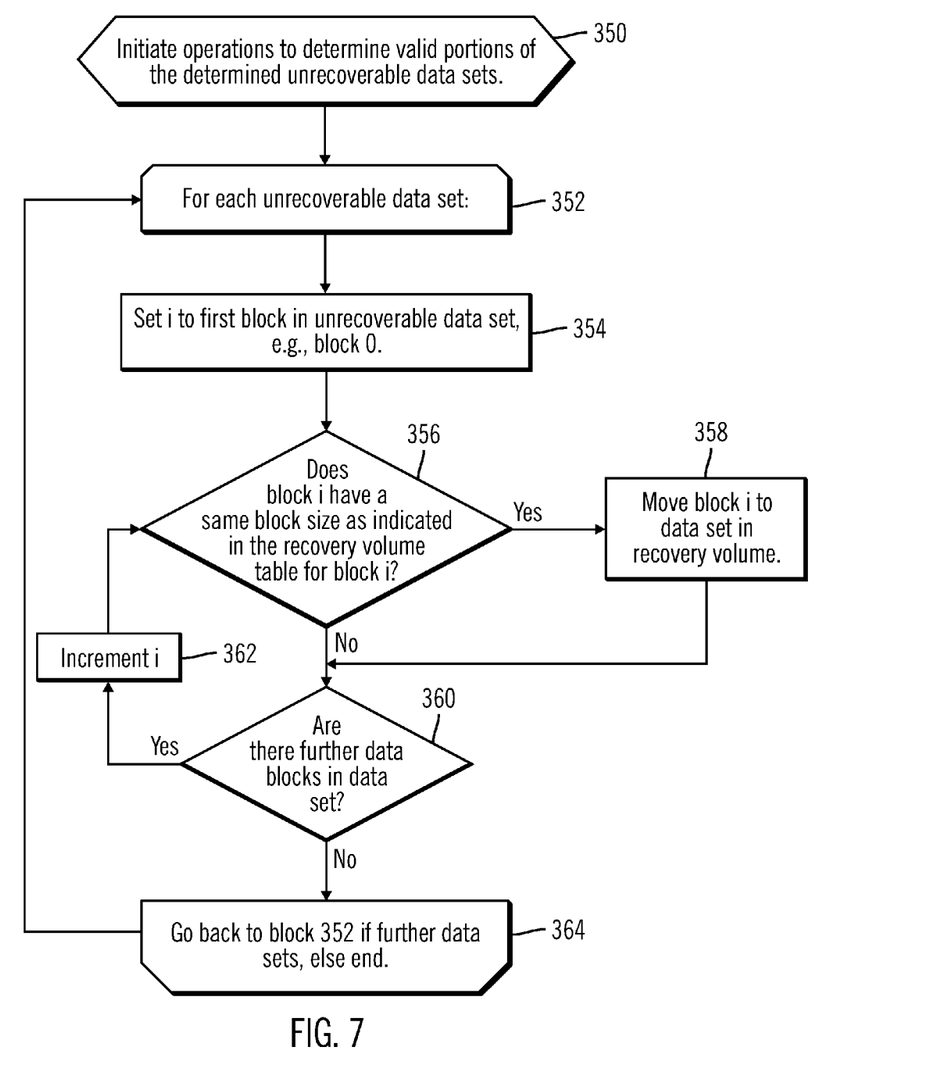
FIG. 7 illustrates an embodiment of operations to determine valid portions of unrecoverable data sets as part of recovering the corrupted volume.

FIG. 7 illustrates an embodiment of operations performed by the operating system 8 (or other program module in the host 2) to determine valid portions of the determined unrecoverable data sets 14. In certain embodiments, the operations of FIG. 7 may comprise the operations performed at block 318 in FIG. 6. Upon initiating (at block 350) operations to determine valid portions of the unrecoverable data sets 14, the operating system 8 performs a series of operations at blocks 352 through 364 for each unrecoverable data set 14 to try to restore. A variable i is set to a first block or track in the unrecoverable data set 14, e.g., block or track 0. If (at block 356) block i has a same block size as indicated in the recovery volume table 42 for block i, then that data block i is moved to the recovery data set 44 for the unrecoverable data set 14 being processed. If (at block 356) block i does not have the same block size or after moving block i (block 358), if (at block 360) there are further data blocks in the data set 14, then i is Described embodiments provide techniques to recover a volume table and data sets for a corrupted volume. Upon detecting a corrupted volume, the operating system or other recovery component diagnoses a current version of a volume table having information on data sets allocated in the volume to determine whether the volume table is valid. If valid, then the volume table may be used in the recovery volume. If not valid, then a backup volume table is accessed and processed using data set records to bring to a current state. Valid data sets may be moved to the recovery volume. Further, for data sets determined not to be valid, a data recovery operation may be initiated to recover data from the invalid data sets. A user may be involved to determine whether to recover data from invalid data sets.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for data recovery of a volume having data sets in a storage device, the computer program product comprising a non-transitory computer readable storage medium having computer readable program code embodied therein that executes to perform operations, the operations comprising:
generating a recovery volume table from a backup volume table, wherein the backup volume table comprises volume table information for backup data sets comprising data sets in the volume as of a backup point-in-time, wherein the recovery volume table provides volume table information for data sets in a recovery volume recovered from the volume;
determining differences between the data sets in the volume and the recovery volume table resulting from changes to the data sets since the backup point-in-time;
modifying the recovery volume table based on the determined differences with the data sets in the volume; and
moving valid data sets to the recovery volume.

2. The computer program product of claim 1, wherein the determining the differences comprises determining the data sets that have been deleted since the backup point-in-time, and wherein modifying the recovery volume table comprises deleting, from the recovery volume table, information on the data sets that are determined to have been deleted.

3. The computer program product of claim 1, wherein the determining the differences comprises determining the data sets that have been added since the backup point-in-time, and wherein modifying the recovery volume table comprises adding information to the recovery volume table on the data sets that are determined to have been added since the backup point-in-time.

4. The computer program product of claim 1, wherein the determining the differences comprises determining the data sets that have been modified since the backup point-in-time, and wherein modifying the recovery volume table comprises updating information in the recovery volume table on the data sets that are determined to have been modified since the backup point-in-time.

5. The computer program product of claim 1, wherein the operations further comprise:
initiating a data recovery operation for the data sets determined not to be valid.

6. The computer program product of claim 1, wherein the generating the recovery volume table comprises copying the backup volume table to the recovery volume table.

7. The computer program product of claim 1, wherein the operations further comprise:
determining from data set records, the data sets in the volume, wherein the data set records are independent of a volume table, wherein the data set records have volume table information for the data sets currently in the volume and record changes to the volume table and the data sets.

8. A system in communication with a storage device having a volume with data sets comprising:
a processor; and
a computer readable storage medium having computer readable program code embodied therein executed by the processor to perform operations, the operations comprising:
generating a recovery volume table from a backup volume table, wherein the backup volume table comprises volume table information for backup data sets comprising data sets in the volume as of a backup point-in-time, wherein the recovery volume table provides volume table information for data sets in a recovery volume recovered from the volume;
determining differences between the data sets in the volume and the recovery volume table resulting from changes to the data sets since the backup point-in-time;
modifying the recovery volume table based on the determined differences with the data sets in the volume; and
moving valid data sets to the recovery volume.

9. The system of claim 8, wherein the determining the differences comprises determining the data sets that have been deleted since the backup point-in-time, and wherein modifying the recovery volume table comprises deleting, from the recovery volume table, information on the data sets that are determined to have been deleted.

10. The system of claim 8, wherein the determining the differences comprises determining the data sets that have been added since the backup point-in-time, and wherein modifying the recovery volume table comprises adding information to the recovery volume table on the data sets that are determined to have been added since the backup point-in-time.

11. The system of claim 8, wherein the determining the differences comprises determining the data sets that have been modified since the backup point-in-time, and wherein modifying the recovery volume table comprises updating information in the recovery volume table on the data sets that are determined to have been modified since the backup point-in-time.

12. The system of claim 8, wherein the operations further comprise:
initiating a data recovery operation for the data sets determined not to be valid.

13. The system of claim 8, wherein the generating the recovery volume table comprises copying the backup volume table to the recovery volume table.

14. The system of claim 8, wherein the operations further comprise:
determining from data set records, the data sets in the volume, wherein the data set records are independent of a volume table, wherein the data set records have volume table information for the data sets currently in the volume and record changes to the volume table and the data sets.

15. A method for handling data corruption, comprising:
generating a recovery volume table from a backup volume table, wherein the backup volume table comprises volume table information for backup data sets comprising data sets in a volume as of a backup point-in-time, wherein the recovery volume table provides volume table information for data sets in a recovery volume recovered from the volume;
determining differences between the data sets in the volume and the recovery volume table resulting from changes to the data sets since the backup point-in-time;
modifying the recovery volume table based on the determined differences with the data sets in the volume; and
moving valid data sets to the recovery volume.

16. The method of claim 15, wherein the determining the differences comprises determining the data sets that have been deleted since the backup point-in-time, and wherein modifying the recovery volume table comprises deleting, from the recovery volume table, information on the data sets that are determined to have been deleted.

17. The method of claim 15, wherein the determining the differences comprises determining the data sets that have been added since the backup point-in-time, and wherein modifying the recovery volume table comprises adding information to the recovery volume table on the data sets that are determined to have been added since the backup point-in-time.

18. The method of claim 15, wherein the determining the differences comprises determining the data sets that have been modified since the backup point-in-time, and wherein modifying the recovery volume table comprises updating information in the recovery volume table on the data sets that are determined to have been modified since the backup point-in-time.

19. The method of claim 15, further comprising:
initiating a data recovery operation for the data sets determined not to be valid.

20. The method of claim 15, wherein the generating the recovery volume table comprises copying the backup volume table to the recovery volume table.

21. The method of claim 15, further comprising:
determining from data set records, the data sets in the volume, wherein the data set records are independent of a volume table, wherein the data set records have volume table information for the data sets currently in the volume and record changes to the volume table and the data sets.

* * * * *